United States Patent
Young

(10) Patent No.: US 9,355,366 B1
(45) Date of Patent: May 31, 2016

(54) AUTOMATED SYSTEMS FOR IMPROVING COMMUNICATION AT THE HUMAN-MACHINE INTERFACE

(71) Applicant: Hello-Hello, Inc., Albuquerque, NM (US)

(72) Inventor: Charles E. Young, Albuquerque, NM (US)

(73) Assignee: HELLO-HELLO, INC., Albuquerque, NM (US)

( * ) Notice: Subject to any disclaimer, the term of this patent is extended or adjusted under 35 U.S.C. 154(b) by 316 days.

(21) Appl. No.: 13/712,906

(22) Filed: Dec. 12, 2012

Related U.S. Application Data

(60) Provisional application No. 61/577,513, filed on Dec. 19, 2011.

(51) Int. Cl.
    *G06N 99/00* (2010.01)
(52) U.S. Cl.
    CPC .................... *G06N 99/005* (2013.01)
(58) Field of Classification Search
    CPC ...... G06K 9/00302–9/00315; G06K 9/00288–9/00295; G06K 9/00885–2009/00966; G06K 9/6256–9/6259; G06F 3/01–3/017
    See application file for complete search history.

(56) References Cited

U.S. PATENT DOCUMENTS

| | | | |
|---|---|---|---|
| 3,748,750 A | 7/1973 | Viemeister | |
| 4,358,277 A | 11/1982 | Moyes et al. | |
| 4,646,145 A | 2/1987 | Percy et al. | |
| 4,647,964 A | 3/1987 | Weinblatt | |
| 4,745,468 A | 5/1988 | Von Kohorn | |
| 4,789,235 A | 12/1988 | Borah et al. | |
| 4,861,154 A | 8/1989 | Sherwin et al. | |
| 4,870,579 A | 9/1989 | Hey | |
| 4,931,865 A | 6/1990 | Scarampi | |
| 4,943,963 A | 7/1990 | Waechter et al. | |
| 4,958,284 A | 9/1990 | Bishop et al. | |

(Continued)

FOREIGN PATENT DOCUMENTS

KR    1020020067759 A    8/2002
KR    10-2003-0031809    12/2004

(Continued)

OTHER PUBLICATIONS

Tao, Jianhua et al.; "Affective Computing: A Review"; 2005; Springer-Verlag Berlin Heidelberg; ACII 2005, LNCS 3784; pp. 981-995.*

(Continued)

*Primary Examiner* — Stanley K Hill
*Assistant Examiner* — Thomas Fink
(74) *Attorney, Agent, or Firm* — Philip D. Askenazy; Peacock Myers, P.C.

(57) ABSTRACT

Apparatuses and methods for measuring audience response to a presentation such as an advertisement. Software is trained using a feedback loop to correlate biometric data, such as eye tracking, facial recognition, or pupil dilation, with emotion, attention, memory, and/or meaning remembered by a viewer as measured by methods related to the Picture Sorts technique. The trained software then enables a device that uses biometric measurement to detect and measure such qualities in a viewer as the presentation is being viewed. In this way, unlike existing systems, the attention, memory and both primary and compound emotions of the viewer can be measured, enabling key moments of the presentation to be detected.

8 Claims, 13 Drawing Sheets

(56) References Cited

U.S. PATENT DOCUMENTS

| | | | |
|---|---|---|---|
| 5,034,807 A | 7/1991 | Von Kohorn | |
| 5,041,972 A | 8/1991 | Frost | |
| 5,052,401 A | 10/1991 | Sherwin | |
| 5,220,501 A | 6/1993 | Lawlor et al. | |
| 5,227,874 A | 7/1993 | Von Kohorn | |
| 5,243,517 A | 9/1993 | Schmidt et al. | |
| 5,331,969 A | 7/1994 | Silberstein | |
| 5,424,945 A | 6/1995 | Bell | |
| 5,465,729 A | 11/1995 | Bittman et al. | |
| 5,508,731 A | 4/1996 | Kohorn | |
| 5,544,354 A | 8/1996 | May et al. | |
| 5,551,880 A | 9/1996 | Bonnstetter et al. | |
| 5,618,179 A | 4/1997 | Copperman et al. | |
| 5,676,138 A | 10/1997 | Zawilinski | |
| 5,731,805 A | 3/1998 | Tognazzini et al. | |
| 5,823,879 A | 10/1998 | Goldberg et al. | |
| 5,855,008 A | 12/1998 | Goldhaber et al. | |
| 5,916,024 A | 6/1999 | Von Kohorn | |
| 5,978,648 A | 11/1999 | George et al. | |
| 5,991,595 A | 11/1999 | Romano et al. | |
| 5,991,734 A | 11/1999 | Moulson | |
| 5,995,941 A | 11/1999 | Maquire et al. | |
| 6,011,578 A | 1/2000 | Shatto et al. | |
| 6,088,030 A | 7/2000 | Bertram et al. | |
| 6,118,427 A | 9/2000 | Buxton et al. | |
| 6,134,531 A | 10/2000 | Trewitt et al. | |
| 6,311,190 B1 | 10/2001 | Bayer et al. | |
| 6,322,368 B1 | 11/2001 | Young | |
| 6,502,076 B1 | 12/2002 | Smith | |
| 6,519,571 B1 | 2/2003 | Guheen et al. | |
| 6,604,239 B1 | 8/2003 | Koen | |
| 6,731,307 B1 * | 5/2004 | Strubbe et al. | 715/727 |
| 6,839,680 B1 | 1/2005 | Liu et al. | |
| 6,868,525 B1 | 3/2005 | Szabo | |
| 6,904,408 B1 | 6/2005 | McCarthy et al. | |
| 7,151,540 B2 | 12/2006 | Young | |
| 7,169,113 B1 | 1/2007 | Young | |
| 7,181,438 B1 | 2/2007 | Szabo | |
| 7,475,121 B2 | 1/2009 | Ushigusa | |
| 7,886,326 B2 | 2/2011 | Xiao | |
| 8,027,906 B2 | 9/2011 | Young | |
| 8,062,220 B2 | 11/2011 | Kurtz et al. | |
| 8,155,400 B2 | 4/2012 | Bronstein et al. | |
| 8,233,678 B2 | 7/2012 | Ogawa | |
| 8,254,691 B2 | 8/2012 | Kaneda et al. | |
| 8,768,864 B2 * | 7/2014 | Kane-Esrig | 706/12 |
| 8,863,619 B2 * | 10/2014 | Frank et al. | 76/12 |
| 2001/0027410 A1 | 10/2001 | Ueda | |
| 2001/0048439 A1 | 12/2001 | Young | |
| 2003/0145323 A1 | 7/2003 | Hendricks et al. | |
| 2004/0210479 A1 | 10/2004 | Perkowski et al. | |
| 2005/0197988 A1 | 9/2005 | Bublitz | |
| 2005/0198316 A1 | 9/2005 | Gold et al. | |
| 2005/0283395 A1 | 12/2005 | Lesandrini et al. | |
| 2006/0178908 A1 | 8/2006 | Rappaport | |
| 2006/0212350 A1 | 9/2006 | Ellis et al. | |
| 2006/0242129 A1 | 10/2006 | Libes et al. | |
| 2007/0066916 A1 * | 3/2007 | Lemos | 600/558 |
| 2007/0173733 A1 * | 7/2007 | Le et al. | 600/544 |
| 2007/0197933 A1 | 8/2007 | Young | |
| 2007/0198353 A1 | 8/2007 | Behringer et al. | |
| 2008/0040175 A1 | 2/2008 | Dellovo | |
| 2008/0040205 A1 | 2/2008 | Gold et al. | |
| 2008/0077478 A1 | 3/2008 | Kim | |
| 2008/0097854 A1 | 4/2008 | Young | |
| 2008/0147487 A1 | 6/2008 | Hirshberg | |
| 2008/0215417 A1 | 9/2008 | Young | |
| 2010/0165091 A1 | 7/2010 | Teranishi | |
| 2010/0211439 A1 * | 8/2010 | Marci et al. | 705/10 |
| 2010/0266213 A1 | 10/2010 | Hill | |
| 2010/0310157 A1 * | 12/2010 | Kim et al. | 382/159 |
| 2010/0321519 A1 | 12/2010 | Bill | |
| 2011/0263946 A1 * | 10/2011 | el Kaliouby et al. | 600/300 |
| 2011/0301433 A1 * | 12/2011 | Sadowsky et al. | 600/300 |
| 2011/0310237 A1 | 12/2011 | Wang et al. | |
| 2012/0002848 A1 | 1/2012 | Hill | |
| 2012/0023135 A1 | 1/2012 | Dahlkvist et al. | |
| 2012/0162443 A1 * | 6/2012 | Allen | 348/207.1 |
| 2012/0206603 A1 | 8/2012 | Rekimto et al. | |
| 2014/0112556 A1 * | 4/2014 | Kalinli-Akbacak | 382/128 |

FOREIGN PATENT DOCUMENTS

| | | |
|---|---|---|
| KR | 10-2006-7026074 | 1/2007 |
| WO | WO 98/06193 | 2/1998 |
| WO | 01/18723 A1 | 3/2001 |
| WO | 2012/131149 A1 | 10/2012 |

OTHER PUBLICATIONS

Affective Characterization of Movie Scenes Based on Content Analysis and Physiological Changes, by Soleymani et al., published 2009.*

Bartlett, Marian et al., "Computer Expression Recognition Toolbox", 8th International IEEE Conference on Automatic Face and Gesture Recognition. Amsterdam, 2008.

Bartlett, Marian et al., "Insights on spontaneous facial expressions from automatic expression measurement", Giese,M. Curio, C., Bulthoff, H. (Eds.) Dynamic Faces: Insights from Experiments and Computation. MIT Press, 2010.

Bartlett, Marian S. et al., "Automated Facial Expression Measurement: Recent Applications to Basic Research in Human Behavior, Learning, and Education", Calder, et al. (Eds.), Handbook of Face Perception, Oxford University Press, 2010.

Bartlett, Marian S. et al., "Automatic Recognition of Facial Actions in Spontaneous Expressions", Journal of Multimedia, vol. 1, No. 6. Academy Publisher, Sep. 2006, 22-35.

Bartlett, Marian S. et al., "Classifying Facial Action", Advances in Neural Information Processing Systems 8, MIT Press, Cambridge, MA., 1996, 823-829.

Bartlett, Marian S. et al., "Image representations for facial expressions coding", S. Solla, T. Leen, & K. Mueller, Eds. Advances in Neural Information Processing Systems 12, Cambridge, MA: MIT Press, 2000, 886-892.

Bartlett, Marian S. et al., "Measuring Facial Expressions by Computer Image Analysis", Psychophysiology, vol. 36, No. 2, Mar. 1999, 253-263.

Bartlett, Marian S. et al., "Recognizing Facial Expression: Machine Learning and Application to Spontaneous Behavior", Computer Vision and Pattern Recognition, 2005.

Bettadapura, Vinay , "Face Expression Recognition and Analysis: The State of the Art", Emotion, 2009, 1-27.

Bolt, Richard A. , "Conversing with Computers", Technology Review, vol. 88, No. 10, Feb. 3, 1985, 34.

Chew, S. W. et al., "Improved Facial Expression Recognition via Uni-Hyperplane Classification", 2012 IEEE Conference on Computer Vision and Pattern Recognition (CVPR), Providence, Rhode Island, Jun. 16-21, 2012.

Dinges, David F. et al., "Optical Computer Recognition of Facial Expressions Associated with Stress Induced by Performance Demands", Aviation, Space, and Environmental Medicine, vol. 76, No. 6, Section II, Jun. 2005, B172-B182.

Donato, Gianluca et al., "Classifying Facial Actions", IEEE Transactions on Pattern Analysis and Machine Intelligence, vol. 21, No. 10, Oct. 1999, 974-989.

Eliashberg, Jehoshua et al., "MOVIEMOD: An Implementable Decision Support System for Pre-Release Market Evaluation of Motion Pictures", Huntsman Center for Innovation and Global Competition at University of Pennsylvania and MovieMod, Dec. 2007.

Kahneman, Daniel , "Thinking, Fast and Slow", Farrar, Straus and Giroux, New York, New York, 2011, pp. 19-30, 377-385, 408.

Krugman, Dean M. et al., "Do adolescents attend to warnings in cigarette advertising?", Journal of Advertising Research, vol. 34, No. 6, Nov.-Dec. 1994, 39-52.

Li, Chao et al., "3D Facial Expression Recognition for the Enhancement of Human-Computer Interaction", FLAIRS Conference, AAAI Press, 2006, 172-173.

(56) References Cited

OTHER PUBLICATIONS

Littlewort, Gwen et al., "Dynamics of facial expression extracted automatically from video", Image and Vision Computing, vol. 24, 2006, 615-625.
Littlewort, Gwen et al., "The Computer Expression Recognition Toolbox (CERT)", IEEE International Conference on Automatic Face and Gesture Recognition and Workshops, Santa Barbara, CA., Mar. 21-25, 2011.
Lohse, Gerald L., "Consumer eye movement patters on yellow pages advertising", Journal of Advertising, vol. 26, 1997, 61-73.
Madrigal, Robert et al., "Suspense as an Experience of Mixed Emotions: Feelings of Hope and Fear While Watching Suspenseful Commercials", Advances of Consumer Research, vol. 32, 2005, 561-567.
Murthy, G. R. et al., "Effectiveness of Eigenspaces for Facial Expressions Recognition", International Journal of Computer Theory and Engineering, vol. 1, No. 5, Dec. 2009, 638-642.
Page, Graham et al., "Cognitive Neuroscience, Marketing and Research", Congress 2006, 2006, 1-25.
Sikka, Karan et al., "Exploring Bag of Word Architectures in the Facial Expression Domain", Fitzgibbon et al. (Eds), European Conference on Computer Vision, Workshop on What's in a Face, Lecture Notes in Computer Science, vol. 7584, 2012, 250-259.
Tian, Ying-Li et al., "Facial Expression Analysis", Handbook of Face Recognition, S.Z. Li & A.K. Jain, ed., Springer, 2003.
Tulving, Endel , "Precis of Elements of episodic memory", The Behavioral and Brain Sciences 7:2, 1984, 223-268.
Whitehill, Jacob et al., "Towards Practical Smile Detection", IEEE Transactions on Pattern Analysis and Machine Intelligence, vol. 99, No. 2, 2009, 2106-2111.
Wu, Tingfan et al., "Facial Expressions Recognition Using Gabor Motion Energy Filters", IEEE CVPR workshop on Computer Vision and Pattern Recognition for Human Communicative Behavior Analysis, 2010.
Wu, Tingfan et al., "Multi-Layer Architectures for Facial Action Unit Recognition", IEEE Transactions on Systems, Man and Cybernetics, Part B, Cybernetics, May 11, 2012.
Young, Charles , "Branded Memory", Ad Essentials, LLC and Ideas in Flight, Seattle, Washington, Oct. 2011.
Young, Charles E. et al., "Guideline: tracking the Commerical Viewer's Wandering Attention", Journal of Advertising Research—Jun./Jul. 1987, 15-22.
Young, Charles E. , "The Advertising Research Handbook", Second Edition, Ideas in Flight, Seattle, Washington, Oct. 2008.
Young, Charles E. et al., "The Visual Experience of New and Established Product Commercials", Advances in Consumer Research, vol. 18, 1997, 545-549.
Young, Charles E. et al., "Video Rhythms and Recall", Journal of Advertising Research, vol. 29, No. 3, Jul. 1989, 22-25.
Young, Charles E. et al., "Visual Connectedness and Persuasion", Journal of Advertising Research, Mar.-Apr. 1992, 51-59.
Young, Chuck E. , "Researcher as teacher", Quirk's Marketing Research Review, Mar. 2001.
Zhan, CE et al., "A Real-Time Facial Expressions Recognition System for Online Games", International Journal of Computer Games Technology, Hidawi Publishing Corporation, 2008, 1-7.
Zhang, Zhengyou , "Feature-Based Facial Expression Recognition: Sensitivity Analysis and Experiments with a Multi-Layer Perceptron", International Journal of Pattern Recognition and Artificial Intelligence, vol. 13, No. 6, 1999, 893-911.

\* cited by examiner

Measuring Compound Emotional Memories

Flow of Meaning for Various Emotions

| From Picture Sort | Primary Emotions | | | | | | Compound Emotions | | | | | None of the Above |
|---|---|---|---|---|---|---|---|---|---|---|---|---|
| | Happy | Surprised | Angry | Disgusted | Sad | Scared | Powerful | Determined | Confused | Funny | Disappointed | |
| 1 | 6 | 1 | 0 | 1 | 59 | 0 | 1 | 0 | 3 | 6 | 6 | 28 |
| 2 | 10 | 4 | 0 | 4 | 39 | 0 | 1 | 1 | 7 | 8 | 8 | 34 |
| 3 | 14 | 4 | 0 | 2 | 14 | 0 | 2 | 8 | 4 | 9 | 4 | 47 |
| 4 | 5 | 7 | 0 | 1 | 2 | 0 | 5 | 0 | 6 | 2 | 2 | 72 |
| 5 | 21 | 4 | 0 | 7 | 24 | 2 | 5 | 11 | 5 | 24 | 13 | 14 |
| 6 | 7 | 6 | 0 | 13 | 39 | 0 | 3 | 7 | 7 | 21 | 16 | 12 |
| 7 | 18 | 2 | 0 | 2 | 14 | 1 | 1 | 13 | 6 | 17 | 8 | 34 |
| 8 | 6 | 3 | 0 | 16 | 51 | 0 | 2 | 3 | 4 | 10 | 11 | 19 |
| 9 | 4 | 4 | 1 | 21 | 51 | 1 | 2 | 4 | 4 | 17 | 10 | 14 |
| 10 | 19 | 4 | 1 | 0 | 4 | 0 | 5 | 45 | 7 | 19 | 1 | 18 |

Primary Emotions

≟

Compound Emotions

JOY + SADNESS = FAINT HOPE

FEAR + SURPRISE = SPOOKED

AUTOMATED SYSTEMS FOR IMPROVING COMMUNICATION AT THE HUMAN-MACHINE INTERFACE

CROSS-REFERENCE TO RELATED APPLICATIONS

This application claims the benefit of the filings of U.S. Provisional Patent Application Ser. No. 61/577,513, entitled "Automated Systems for Improving Communication at the Human-Machine Interface", filed on Dec. 19, 2011, and the specification thereof is incorporated herein by reference. This application is also related to U.S. Pat. No. 6,322,368, "Training and Testing Human Judgment of Advertising Materials", U.S. Pat. No. 7,169,113, "Portrayal of Human Information Visualization", and U.S. Pat. No. 7,151,540, "Audience Attention and Response Evaluation", and the specifications and claims thereof are incorporated herein by reference.

BACKGROUND OF THE INVENTION

Field of the Invention (Technical Field)

In face-to-face communication, two human beings continuously react and adapt the content of what is being communicated based on the nonverbal signals displayed in the facial expressions of the person with whom one is attempting to communicate. For example, a salesperson will adapt his sales pitch in mid-stream based on the emotions perceived in the facial responses of a sales prospect reacting to the salesperson's pitch.

Human-machine interaction, such as watching television or looking at the screen of a computer, smart phone or computer pad or tablet, is like face-to-face communication to the extent that the human user reads a screen much like they would read a face, i.e. rapidly taking in information and imagery conveying emotional content on a non-verbal level that is highly mediated by unconscious processes in the mind. The perceptual processes of scanning and sorting through the visual information presented on a screen has been extensively studied and written about in two books by Charles Young, The Advertising Research Handbook and Branded Memory, and is described in U.S. Pat. No. 7,151,540, Audience Attention and Response Evaluation, and U.S. Pat. No. 8,027,906, Portrayal of Human Information Visualization.

The patterns and salient moments of long term, brand building memory formation in an audience can be determined as a mathematical function combining self-report data regarding the peak moments of the Flow of Attention, the Flow of Emotion and the Flow of Meaning, both for moving and static images, which are related to the Picture Sorts technique described in the above references. Academic research also suggests that when the movement of the eye is recorded, e.g. with an eye-tracking camera, memory is suppressed when the eye saccades or scans across an image, so that memory formation is associated with moments of eye fixation on focal points of attention. Academic research also provides a long history of how human emotions are expressed using the musculature system of the face. As a result it has been possible to read emotional responses on the face using camera recordings in the laboratory. Very recently it has become possible to begin to use the cameras on internet based devices to do eye tracking and read facial emotional response at a distance, with algorithms developed from artificial intelligence computer software.

Biometric science and neuroscience continues to identify external, physical cues to a person's internal states of mind based on physical expressions displayed in the musculature in the face or in the movements of the eyes. For example, research has shown that when the eye moves in a scanning pattern, i.e. saccades, memory is suppressed, so that memories are more likely to be formed when the eye fixates on an element or moment in the field of vision. As another example, when the brain is accessing one type of memory versus another—e.g. episodic versus semantic memory—the eye will tend to orient is one direction over another. As a third example, pupil dilation has been shown to be associated with emotions, such as sexual desire, and mental effort, such as performing deliberative tasks.

In the recent book *Thinking, Fast and Slow*, Daniel Kahneman distinguishes between memories and experiences. "A comment I heard from a member of the audience after a lecture illustrates the difficulty of distinguishing memories from experiences. He told of listening raptly to a long symphony on a disc that was scratched near the end, producing a shocking sound, and he reported that the bad ending "ruined the whole experience." But the experience was not actually ruined, only the memory of it. The experiencing self had had an experience that was almost entirely good, and the bad end could not undo it, because it had already happened. My questioner had assigned the entire episode a failing grade because it had ended very badly, but that grade effectively ignored 40 minutes of musical bliss. Does the actual experience count for nothing?"

Kahneman also provides a novel classification system for grouping the mental processes involved in human decision making. One distinction is between System 1 thinking and System 2 thinking, which roughly corresponds to the categories of Low Involvement versus High Involvement processing used by some advertising researchers. A second distinction is between the Experiencer Self and the Remembered Self. By combining these in accordance with the present invention (see e.g. FIG. 1), it is possible to identify four distinct categories in which various communication research techniques can be classified. Based on this classification, it can be shown that biometric research approaches and the picture sorting technique described in Young's works for probing the Remembered Self are distinct but complementary ways of measuring low involvement processing.

The recent widespread emergence of high quality cameras on everyday computerized devices, such as laptop or mobile phone cameras, has laid the groundwork for improving communication at the human-machine interface by making it possible for a computer to "read" the face and eye activity of the user looking at its screen. To date, applications of this technical capability have been applied to reading the location on a screen at which the user is looking—a form of "eye-tracking"—or for reading at a very primitive level the musculature expressions on the face associated with six primary emotions—anger, disgust, fear, joy, sadness, and surprise (such as is described in the book *Making Comics*. by Scott McCloud).

To date, no method has been devised to teach a computer how to recognize eye movements or the patterns of facial responses of users in order to infer other aspects of the user's internal states-of-mind, for example whether or not more complex or compound emotions such as trust or confidence or curiosity, etc., are being experienced; or the compound emotions associated with the communication of certain categorical meanings or ideas, such as quality or taste or security, etc; or eye movements, facial cues and patterns of facial response associated with processes of learning, such as recognition, familiarity, thinking and remembering, or conversely confusion or disruptions in the flow of attention or engagement, or other responses linked to measures of learning, entertainment, or of sales and marketing effectiveness such as attention, recall, liking, communication, motivation or persuasion.

SUMMARY OF THE INVENTION

An embodiment of the present invention is a method, and a system for practicing such method, for identifying a moment of a presentation, the method comprising displaying a presentation to a first group of viewers, obtaining biometric data from the first group of viewers during the displaying step, obtaining remembered data obtained from the first group of viewers using a method related to showing the viewers selections from the presentation after the displaying step, training a system to correlate the biometric data obtained from the first group of viewers with the remembered data, displaying the presentation to a second group of viewers, obtaining biometric data from the second group of viewers during the second displaying step, using the trained system to identify a time of occurrence of a state of mind of each viewer in the second group of viewers from the biometric data obtained from the second group of viewers, and identifying a moment of the presentation by correlating the time of occurrence of the state of mind with the presentation. The state of mind is optionally selected from a group consisting of emotion, positive emotion, negative emotion, simple emotion, primary emotion, compound emotion, memory, semantic memory, episodic memory, procedural memory, attention, engagement, branding, familiarity, liking, confusion, feelings, believability, relevance, persuasiveness, meaning, degree of fit or association with an anchoring concept such as a brand, and combinations thereof.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate several embodiments of the present invention and, together with the description, serve to explain the principles of the invention. The drawings are only for the purpose of illustrating embodiments of the invention and are not to be construed as limiting the invention. The accompanying figures represent only a partial listing the ways that data obtained from this communication improvement system might be displayed.

DETAILED DESCRIPTION OF THE INVENTION

Figure 1:
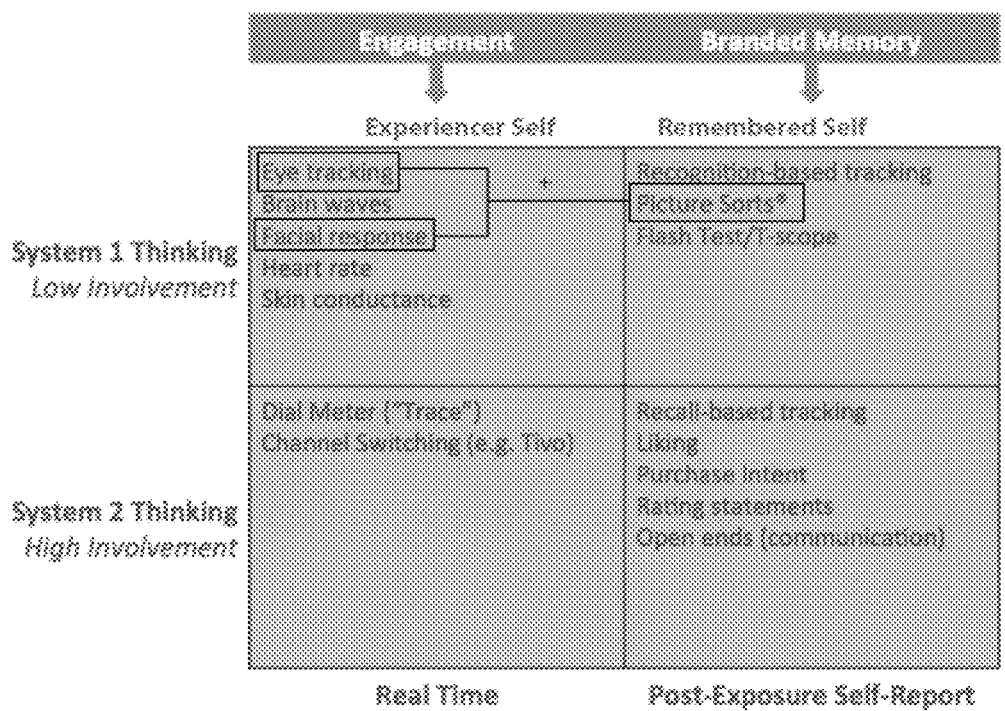
FIG. 1 is a classification of advertising research techniques by system and self.

Embodiments of the present invention improve the effectiveness of the communication that occurs at the human-machine interface by making it possible to teach a machine to "read" the patterns of eye movements and facial responses associated with attention, recognition, comprehension, thinking, remembering, types of remembering, and any positive or negative compound emotions associated with static or moving images that can be measured and studied using the techniques described above in the works of C. Young.

Embodiments of the present invention improve the effectiveness of the communication that occurs at the human-machine interface by use of a system preferably comprising: a camera connected to the internet or some other network, operating in the visible or infrared spectrum, that is used to track the actions of the eye or face of a human in order to collect biometric measures (Thinking System 1/Experiencer Self) of human response; an audience input device connected to the network, for simultaneously collecting self-reported picture sort data (System 1/Remembered Self) regarding measures such as attention, memory, liking, feelings, meanings, or other self-report measures using visual prompts, using either a touch screen using either a drag-and-drop or button feature, or a camera capable of reading the intentional movements of the body, for example, as in reading a "thumbs up or thumbs down" vote at a distance; and a method for synchronizing the real time biometric measurements with the visual stimuli used to collect the picture sort data.

Moreover, since the invention describes a method whereby a machine can preferably infer probabilistically the state of mind of its user at any given moment of use, embodiments of the present invention comprise a training or testing method or control mechanism utilizing data obtained as described above, causing the machine to adapt to the human user experience by changing or optimizing the presentation or sequential order of the content of information and imagery that subsequently is presented to the same, similar, or different human audience.

The following are some elements or steps of the invention, which may be performed in any order or simultaneously, though with particular embodiments of the invention not all of these elements need always be included:

1. Deconstruction of the content (stimulus) appearing on a screen, such as moving images into a plurality of still images, blocks of text into component ideas, or static, graphic images into component visual elements. Each of these elements are then scored, e.g. using either picture sorts or ratings or timed exposures, to collect audience-based or user self-report information on criterion measures of response signaling internal states of mind, including, but not limited to, one or more of attention, engagement, recall, types of memory (e.g. semantic, episodic, procedural), familiarity, liking, confusion, feelings, believability, relevance, persuasiveness, positive and negative emotions (primary or simple and compound), meanings, or degree of fit or association with some other anchoring concept such as a brand.

2. Deconstruction of audience or user eye movements—such as scanning, fixation, pupil dilation, blink rate, orientation, etc—and facial musculature patterns (response), either at particular moments of time or in sequence, associated with watching the screen based content, either viewed as a whole frame or a portion of the frame, using a camera or eye-tracking device attached to the machine. Video of the user's eye movements and facial response may be collected remotely from the camera over the internet or in a physical location.

3. Synchronization in time of the deconstructed elements from steps 1 and 2 so that the correspondence, correlation or probabilistic associations between user's eye movements and facial response patterns and the scored screen content can be determined.

4. Information from steps 1, 2 and 3 may be collected in many ways, for example from the same audience of users currently interacting with the screen, from two different audience samples matched in terms of appropriate audience characteristics such as age, gender, education, culture, location, behavior or other relevant selection criteria, or from a single user using an iterative process.

5. Information from the preceding steps can then be used to teach the machine—e.g. re-program, re-weight or train a neural net or artificial intelligence program—what various user eye movements and facial patterns mean in terms of the inferred user response or internal states of mind, as described in step 1.

6. Once the machine's programming has been trained to recognize a typology of user eye movements and facial responses to known stimuli, from step 1, the machines programming can then preferably identify or predict user states of mind, from similar eye movements and facial patterns, based on exposure to new or previously un-scored screen content. This enhanced predictive ability of the machine's artificial intelligence programming can be updated and validated from time-to-time by repeating the previous steps.

7. Based on previously established parameters of performance, such as attention, engagement, liking, remembering, positive or negative emotional response, comprehension, communication of intended emotions or meanings, etc., the machine can then read the user's eye movements and facial expressions and change or adapt the new, subsequent or unexposed content presented on the screen to optimize and achieve the desired user experience, state of mind, learning or other perceptual effects.

8. An alternate use of the information obtained from the steps 1 thru 6 above is to provide a management control system for reporting on the effectiveness of screen based communications, such as can be used in tracking advertising.

9. One method for displaying the reported information in step 8 is to display a computerized composite "face" or computerized average of the faces associated with various inferred user mental events, such as the moment of recognition or the moment of remembering, certain types of emotions, etc.

10. A variant of this invention is to substitute another machine that measures human experience in real time for the eye and face tracking camera described in step 2, such as a brain wave or EEG machine, or a device for measuring heart rate or skin conductance, or a machine such as fMRI for measuring brain activity in terms of spatial location in the brain. In this variant the self-report, e.g. picture sorting, deconstruction of remembered experience is used to teach an artificial intelligence program how to interpret the meaning of the real time experience measured by the alternate biometric or neuro-metric device. In this variant step 1, and steps 2 thru 8, preferably remain the same.

An optional validation step may be performed, in which the camera can record biometric responses during performing the picture sort task to compare to readings taken prior to the picture sort task during the real time experience of the content of step 2.

In one embodiment of the present invention, a video game, such as an X-box like game, uses a camera as a controller that responds to the player's body language. If the camera were improved to the point of being able to read the player's face or even eye movement, the game could be started with a calibration test, in which the player watches an introductory movie, and then takes a picture sort test about the movie. Because of the accurate camera, the player could use hands or thumbs up/thumbs down body movements to answer the picture sorting questions in a game-like way, so the game could learn to "read" the player during the game and adjust the sequence of play activities in the game to the users' expressions.

Figure 10:
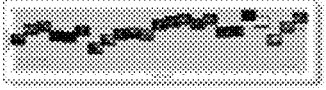
FIG. 10 shows examples of advertising research techniques used in embodiments of the present invention.

FIG. 1 is a classification of advertising research techniques. The right column is what can be measured using the techniques (such as Picture Sorts) described by Young in the references disclosed herein. For example, flow of emotion and flow of meaning can measure a viewer's remembered emotions, which can predict the viewer's motivation and persuasion, and flow of attention can measure a viewer's remembered engagement, memory, and branding. FIG. 10 shows examples of such techniques. Visual peaks plotted while measuring the flow of attention can be a measure of short term memory.

Embodiments of the present invention described herein combine and correlate the top row quadrants of FIG. 1, i.e. System 1/Experience measurements with System 1/Remembered measurements. System 1 Thinking corresponds to pre-conscious or subconscious thoughts, and thus data can be obtained without asking any questions. The viewer typically is just shown pictures and doesn't have to think.

Figure 2:
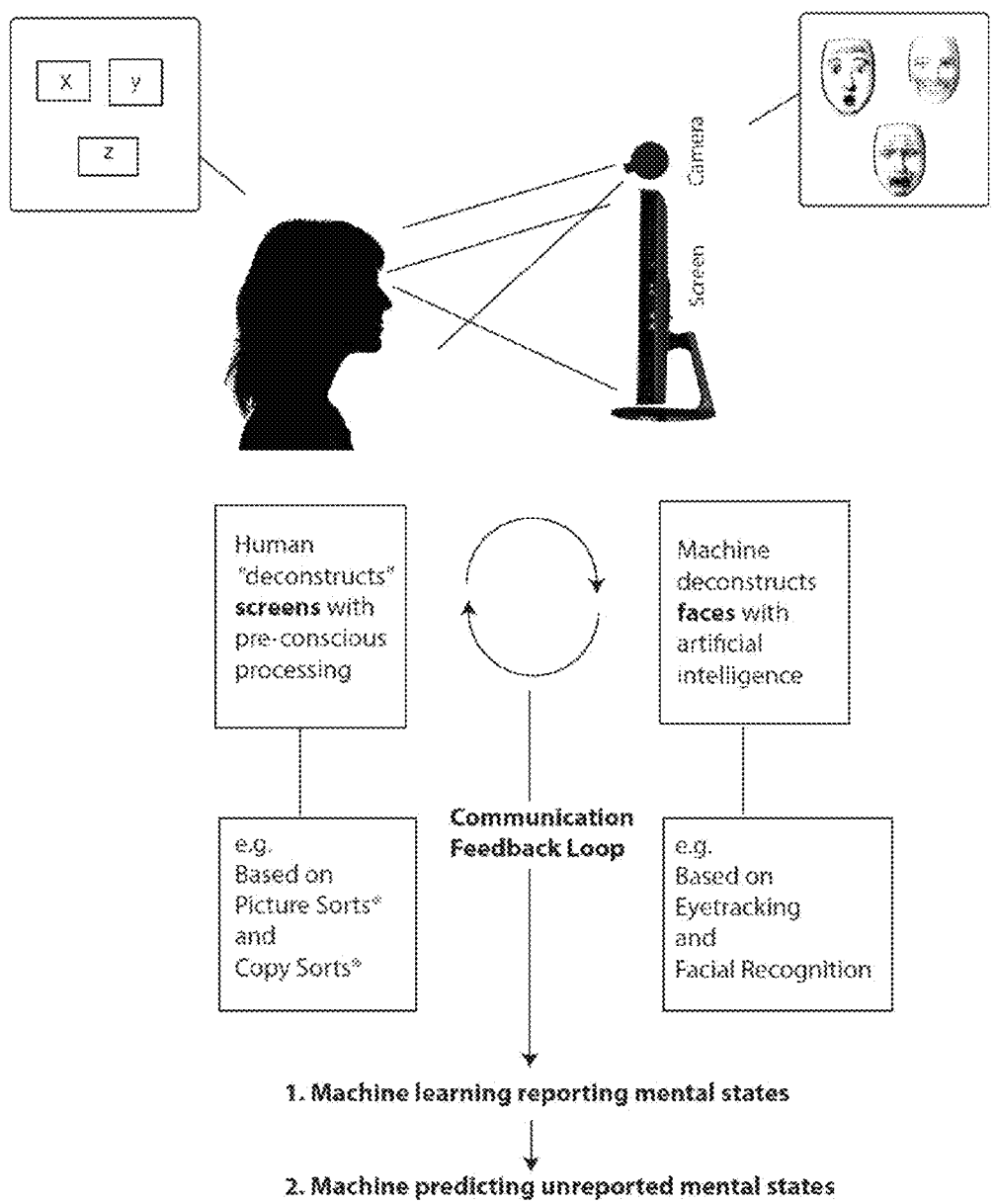
FIG. 2 is a schematic describing a calibration test in accordance with an embodiment of the present invention.

FIG. 2 is a schematic describing a calibration test. The machine biometrically reads, for example, eyes, faces, or gestures while a viewer sees an image or video, and is trained using feedback to correlate the biometric data with what the viewer's primary or compound emotion was when the viewer viewed the image, as self reported and/or as measured by Picture Sorts related techniques, such as Flow of Emotion. In another example, eye tracking can be correlated with flow of attention for determining memory (typically memory is activated only when the eye is fixated, not scanning). Once training is performed on a sample of viewers, which can be as small as twenty viewers, then, the trained system can recognize primary and compound emotions in other audiences passively using eye tracking, pupil dilation, facial recognition, fMRI (or other brainwave measurement), or other biometric measures without having to ask the viewer any questions. The system could thus, for example, automatically determine the most memorable moment of a presentation such as an advertisement.

Figure 3:
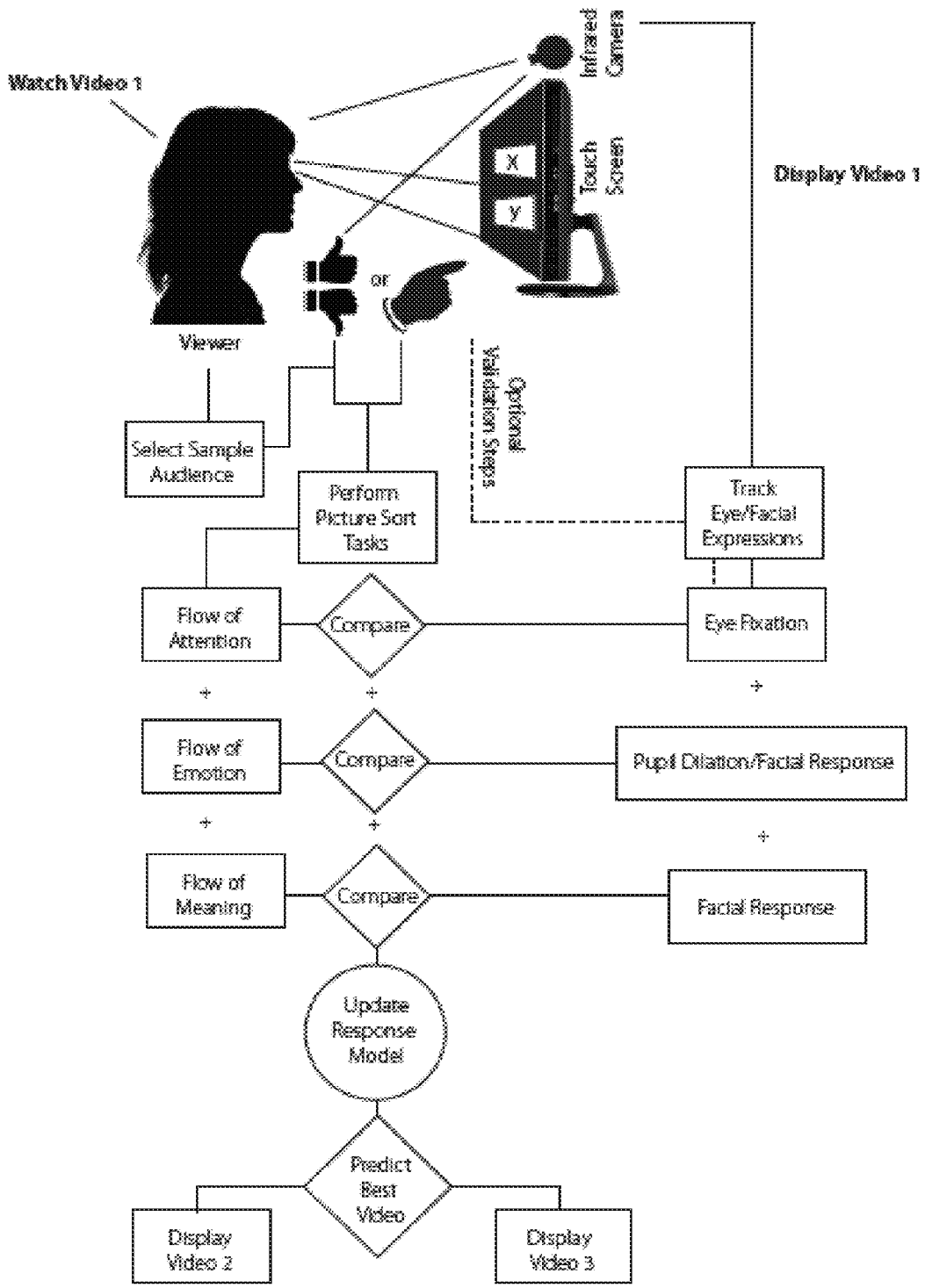
FIG. 3 shows an eye tracking camera being used to help clarify which specific elements within the frame of the screen are triggering specific mental reactions such as attention, memory, emotion, and meaning.

As shown in FIG. 3, the eye tracking camera (or other biometric data acquisition device) can be used to help clarify which specific elements within the frame of the screen are triggering specific mental reactions such as attention, memory, emotion, and meaning.

Figure 4:
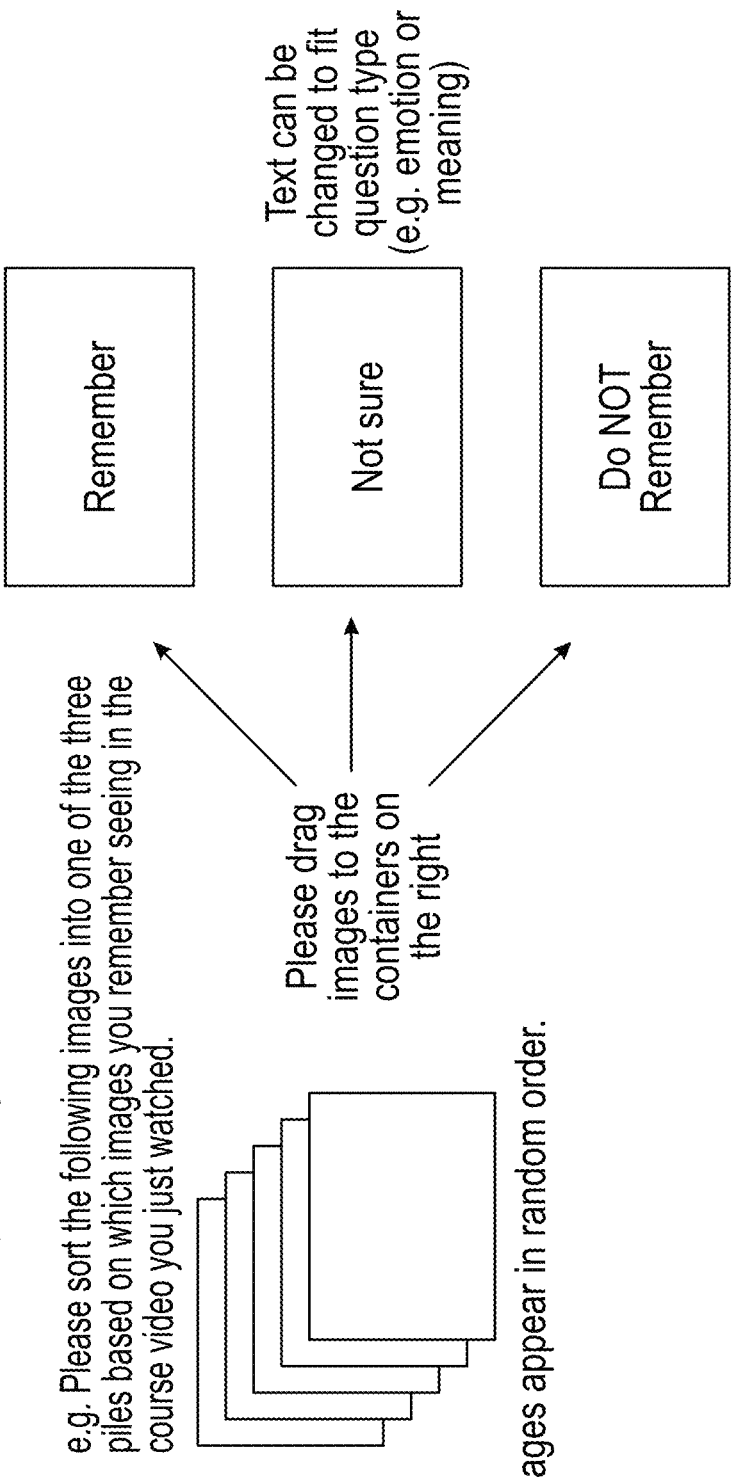
FIG. 4 shows an example of a test that could be performed on a touch screen.

FIG. 4 shows an example of a test that could be performed on a touch screen computer, tablet, pad, mobile phone, or other device. The camera may record facial and eye responses both when the viewer first sees the video stimulus and also while performing the picture sorts Task afterward, in order to provide an extra calibration step.

Figure 5A:
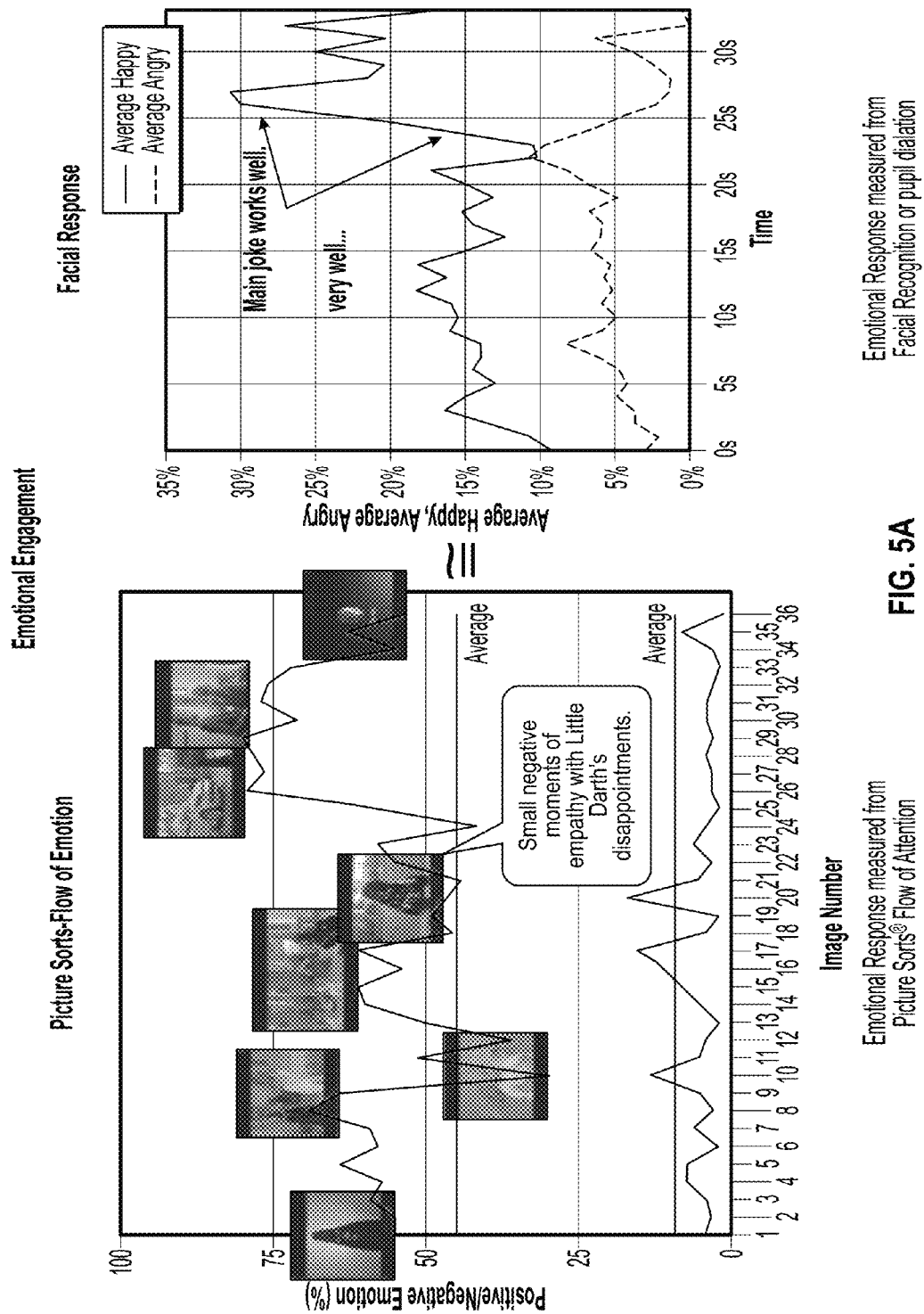
FIG. 5A shows a method for recognizing and measuring emotional response using Picture Sorts Flow of Emotion.
Figure 5B:
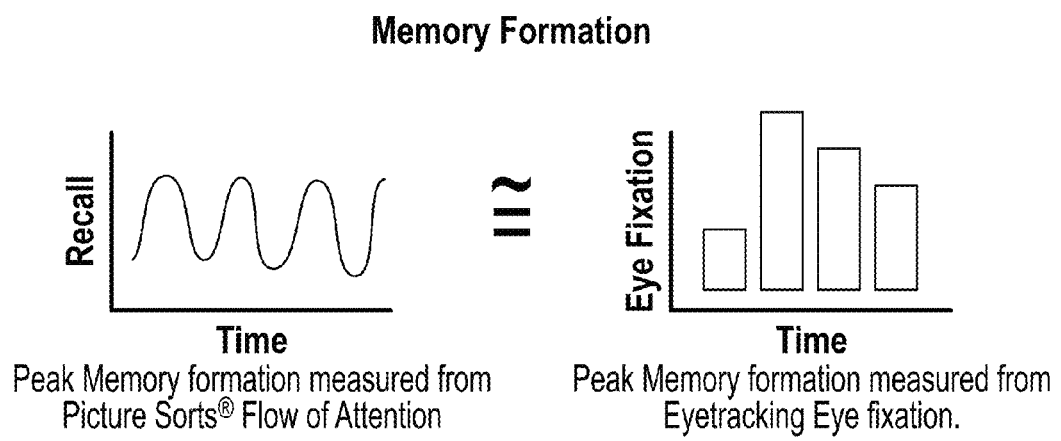
FIG. 5B shows a method for measuring Peak Memory Formation using Picture Sorts Flow of Attention.
Figure 5C:
FIG. 5C shows a method for recognizing and measuring complex and/or compound emotions.
Figure 5C:
Figure 5D:
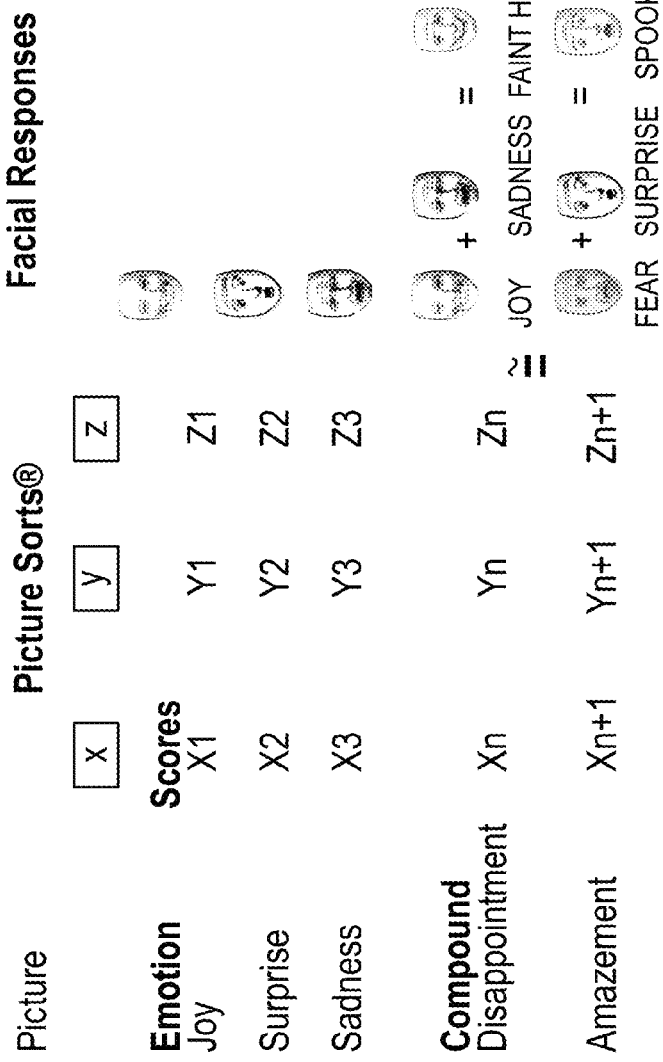
FIG. 5D shows a method for recognizing and measuring complex and/or compound emotions using a feedback loop.

FIGS. 5C and 5D show different methods for recognizing and measuring complex and/or compound emotions, using emotional response as measured by biometrics (equivalent to that measured using Picture Sorts Flow of Emotion, as shown in FIG. 5A) and Peak Memory Formation measured by, for example, eyetracking eye fixation (equivalent to that measured using Picture Sorts Flow of Attention, as shown in FIG. 5B).

Figure 6:
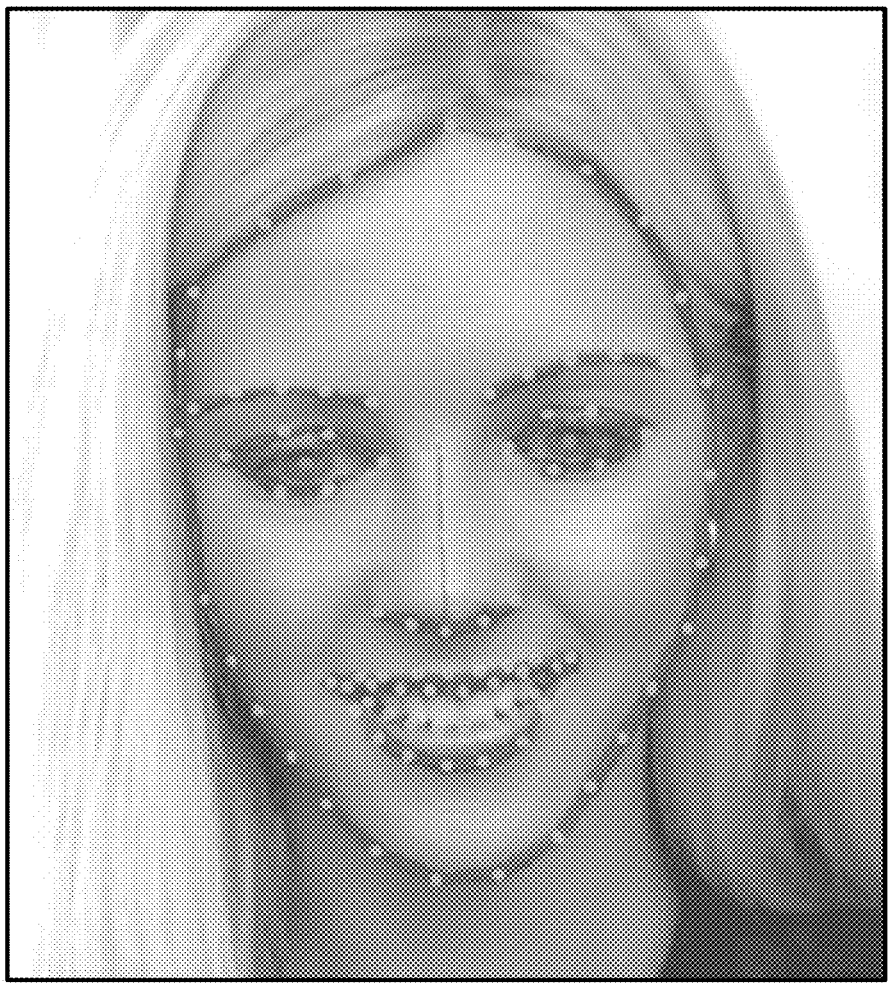
FIG. 6 is an example of measuring facial response and/or recognition using a commercially available system.

FIG. 6 is an example of measuring facial response and/or recognition (preferably online) using a commercially available system, for example Realeyes, Sands Research (brainwaves), Innerscope (biometrics), or Eye Track Shop, that may use a mix of 2D and 3D mathematical models for tracking head pose, eyes, and mouth. While Realeyes produces two measures of response, Binary (on/off—Is an emotion registering on the face?) and Intensity (How strongly is the emotion registering?), the latter measure has been found to be the best fit with self-reported or remembered emotion.

Figure 7:
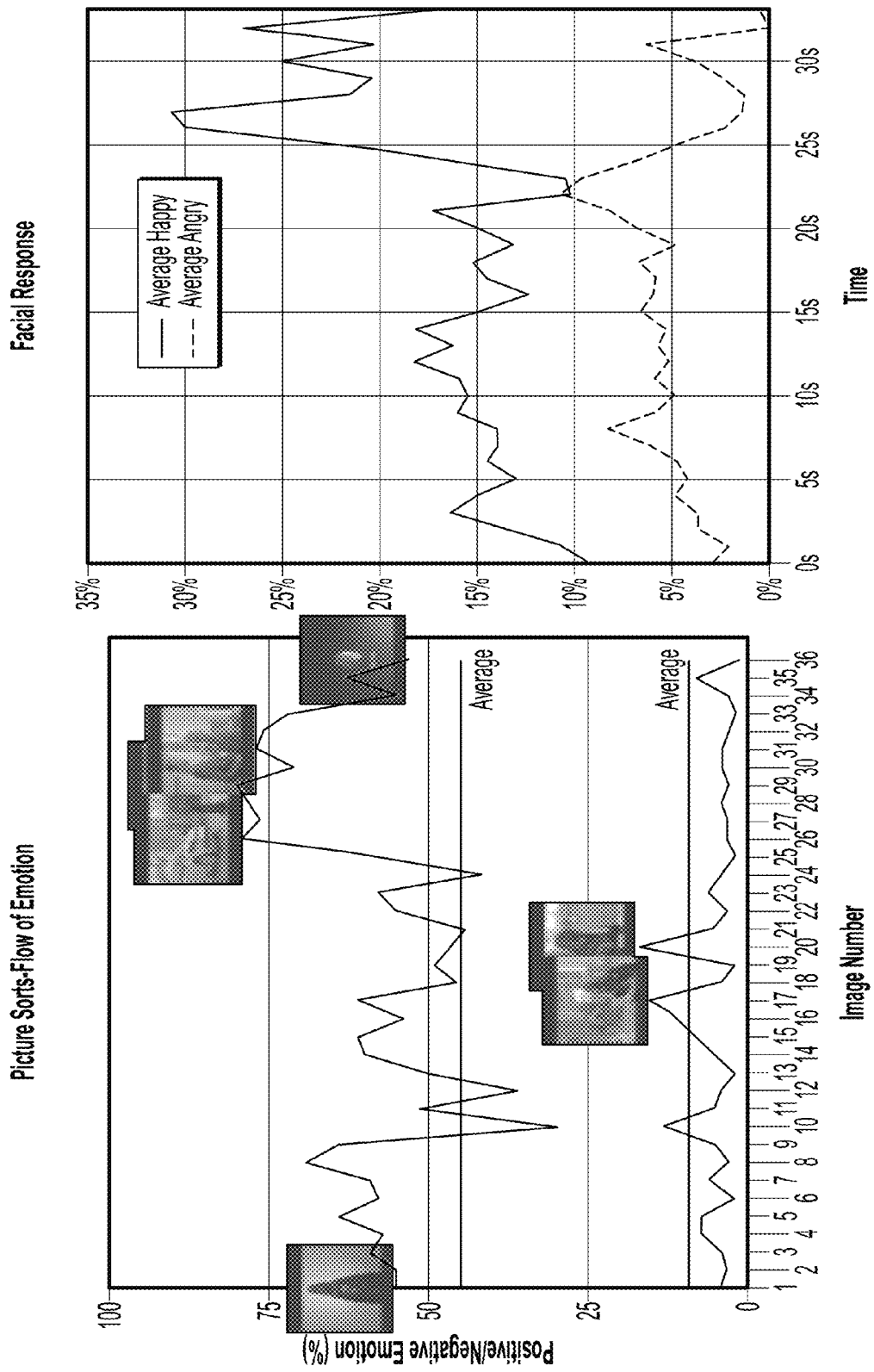
FIG. 7 shows a comparison of positive (upper curves in each graph) and negative (lower curves in each graph) emotional responses using Picture Sorts and biometric facial responses.

FIG. 7 shows a comparison of positive (upper curves in each graph) and negative (lower curves in each graph) emotional response using Picture Sorts and biometric facial response.

Figure 8:
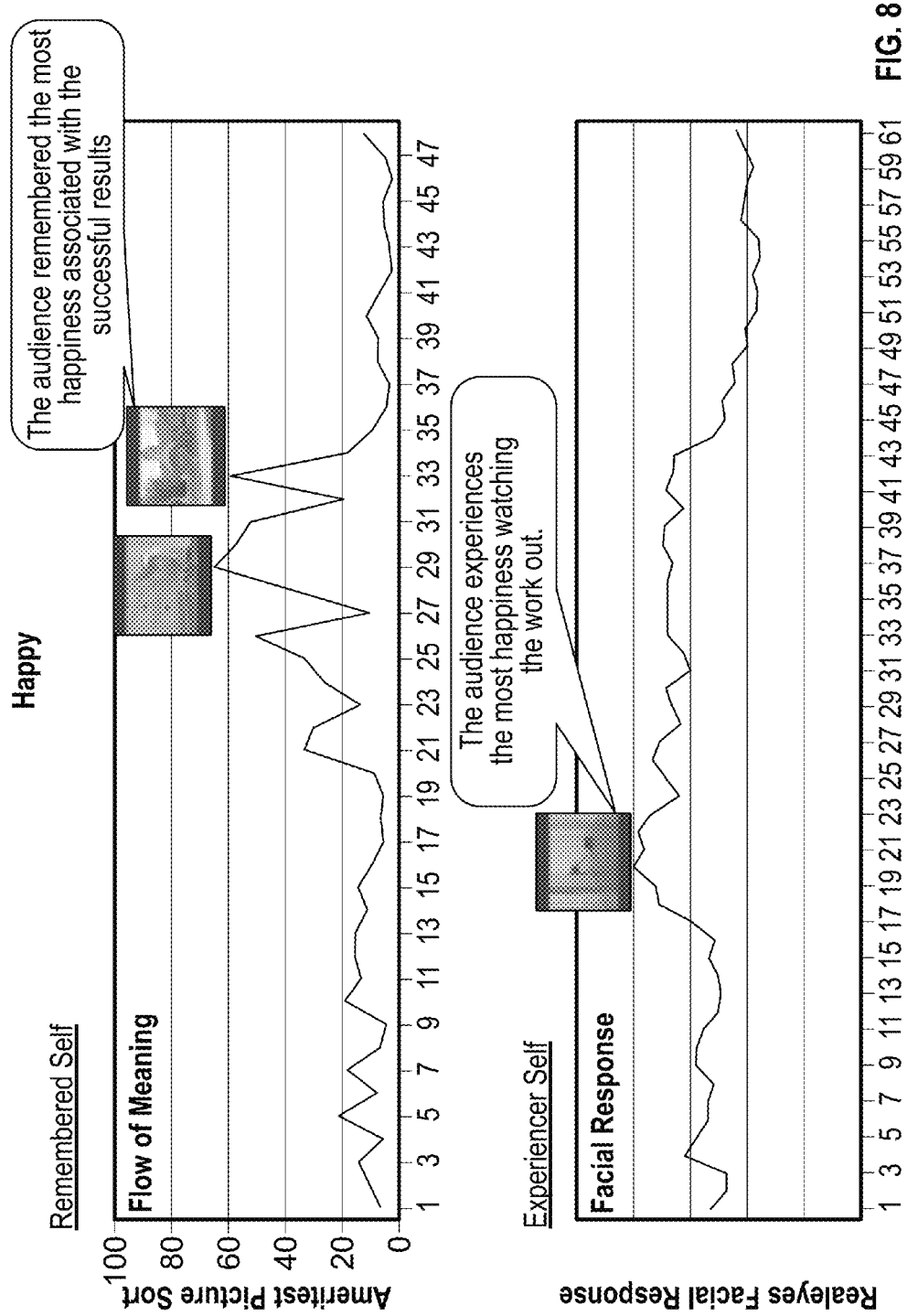
FIG. 8 shows a comparison of remembered emotions and experienced emotions.

FIG. 8 shows a comparison of remembered emotions and experienced emotions (i.e. the difference between what a viewer experiences and what the viewer remembers). Experienced emotions can be measured biometrically, while remembered emotions can be measured using Picture Sorts. These graphs can be produces for any emotion, for example "surprise", not just "happy".

Figure 9:
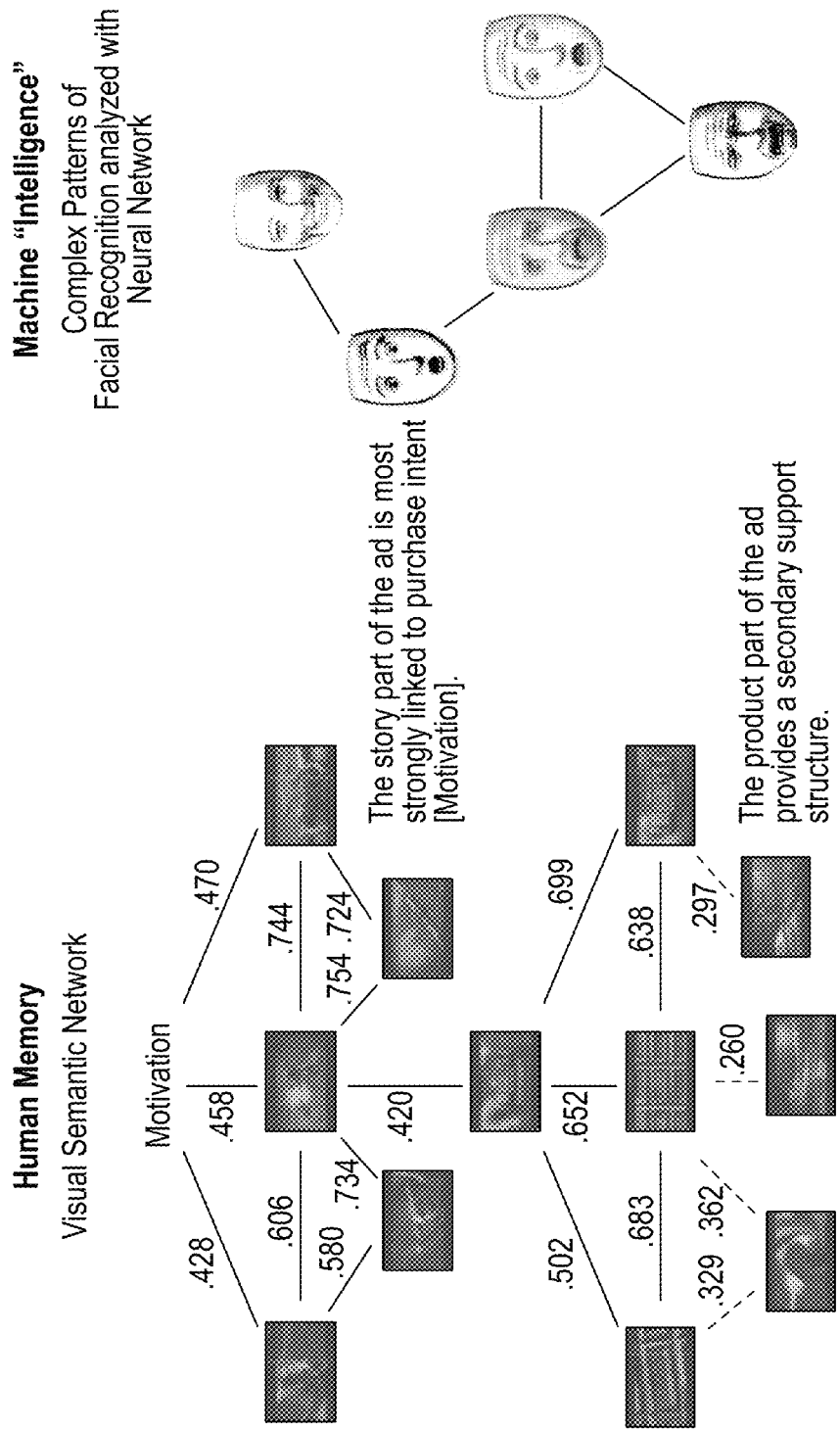
FIG. 9 shows an example of mapping complex patterns of interaction at the human-machine interface for building models.

FIG. 9 shows an example of mapping complex patterns of interaction at the human-machine interface for building models.

Embodiments of the present invention are useful for many fields such as communication, entertainment, advertising, teaching, education, and sales. In one embodiment, a machine of the present invention can recognize a viewer's emotions during a presentation, for example an advertisement, and change the content delivery of the presentation based on those emotions, thereby increasing the viewer's engagement with the presentation. For example, the ending of a movie could be changes, or the method of advertising can be adjusted (e.g. hard sell vs. soft sell).

An embodiment of the present invention is an automated system for detecting and/or predicting memory formation in audiences for mass communications by correlating the ability to detect or predict the most memorable moments or elements of a piece of communication from the methods related to Picture Sorts, which require the active participation of members of an audience to self report data on their internal states of mind, to a passive system, requiring no audience self report participation, for predicting memory formation by leveraging biometric technology. The Picture Sorts techniques "train" or "optimize" software algorithms and camera hardware that are used to transform the camera recordings of eye tracks and facial expressions into meaningful audience response measurements. This new automated system for predicting, or inferring, audience memory formation has potential useful applications that include advertising audience response measurement and automated teaching or training tools.

The following elements are included in the applications of the invention to specific technologies or as feedback loops for training and optimizing certain genres of predictive software and hardware, though not all of the following need be included in any particular embodiment.

Peak moments of audience engagement with moving images, such as video or film, can be identified by picture sorting a test sample of the audience and correlating this self report data with camera recordings of the rates or duration of eye fixation as the eye scans the moving pictures in order to identify the patterns most predictive of the most memorable moments of the video or film. Self report data obtained from the Flow of Attention provides the feedback data for optimizing software or future camera hardware designs to predict the memorable moments in audience response to moving images.

A similar approach to predicting the memorable part or subset of a static image is to substitute the timed exposure method described in the above references for using self report data to analyze audience response to static images for the Flow of Attention picture sort method described therein for use with moving images, as the feedback data for optimizing the camera based memory prediction.

Long term peak memories can be distinguished from transient short term memorable moments in video (as described in the book Branded Memory) by adding picture sorts data of self-reported emotional response, either positive or negative in valence, taken from a sample audience and correlating with the moments predicted by camera-based eye tracking technology to be predictive of memorability, and refining the algorithmic prediction by layering in the camera based information on facial response. Self report data from the Flow of Emotion provides the step for emotional weighting of the software's prediction algorithm.

An alternative approach to refining the memory predictions is to substitute brain wave data or other biometric measurements that have been calibrated using the short term memory test of the Flow of Attention Picture Sort into the software optimization step.

A further feedback step for optimizing the camera based prediction of memory is to identify the meaning or meanings associated by the test audience with particular images in the flow of images or particular elements in a static image, using the Flow of Meaning and correlating this data with the particular facial expressions recorded when the audience is focused or fixated on these moments or elements of the entire communication. Alternatively, brain scan information for the part of the brain being activated in memory formation, e.g. semantic versus episodic versus procedural memories, can be substituted for ascribing certain types of "meanings" to the memories being formed. The self-report data provided by the Flow of Meaning is preferably used to calibrate or validate the brain scan data.

Although the invention has been described in detail with particular reference to these disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for identifying a moment of a presentation, the method comprising:

displaying a presentation to a plurality of viewers;

obtaining biometric data from the plurality of viewers during the displaying step;

showing selections from the presentation to the viewers after the displaying step;

collecting self-reported responses by each viewer regarding the viewer's memory of what the viewer's state of mind was when the viewer viewed each selection of the presentation during the displaying step;

synchronizing the biometric data and the self-reported responses with the content of the presentation;

training a system to correlate the biometric data obtained from the plurality of viewers with the self-reported responses obtained from the plurality of viewers;

subsequently displaying the presentation to a subsequent viewer;

obtaining biometric data from the subsequent viewer during the step of displaying the presentation to the subsequent viewer;

identifying a time of occurrence of a state of mind of the subsequent viewer from the biometric data obtained from the subsequent viewer using the trained system;

and identifying a moment of the presentation by correlating the time of occurrence of the state of mind with the presentation.

2. The method of claim 1 wherein the state of mind is selected from a group consisting of emotion, positive emotion, negative emotion, simple emotion, primary emotion, compound emotion, memory, semantic memory, episodic memory, procedural memory, attention, engagement, branding, familiarity, liking, confusion, feelings, believability, relevance, persuasiveness, meaning, degree of fit or association with an anchoring concept such as a brand, and combinations thereof.

3. The method of claim 1 wherein the step of obtaining biometric data from the plurality of viewers comprises using a device selected from the group consisting of a brain wave machine, an EEG machine, a device for measuring heart rate, a device for measuring skin conductance, an fMRI machine, and a camera operating in the visible or infrared spectrum for tracking pupil dilation and/or the movements of eyes and/or facial muscles of the viewers.

4. The method of claim 1 wherein the step of obtaining biometric data from the subsequent viewer comprises using a device selected from the group consisting of a brain wave machine, an EEG machine, a device for measuring heart rate, a device for measuring skin conductance, an fMRI machine, and a camera operating in the visible or infrared spectrum for tracking pupil dilation and/or the movements of eyes and/or facial muscles of the viewers.

5. The method of claim 1 further comprising changing the content of the presentation shown to a viewer based on the biometric data obtained from that viewer while the presentation is being displayed to the viewer.

6. The method of claim 1 further comprising optimizing the presentation shown to a viewer with respect to a desired user experience, state of mind, learning or other perceptual effect based on the biometric data obtained from that viewer while the presentation is being displayed to the viewer.

7. The method of claim 1 wherein the system comprises a neural network or artificial intelligence system.

8. The method of claim 1 further comprising performing facial recognition of one of the plurality of viewers or the subsequent viewer.

* * * * *